J. OLMSTED.
Corn-Planter.
No. 44,920. Patented Nov. 1, 1864.
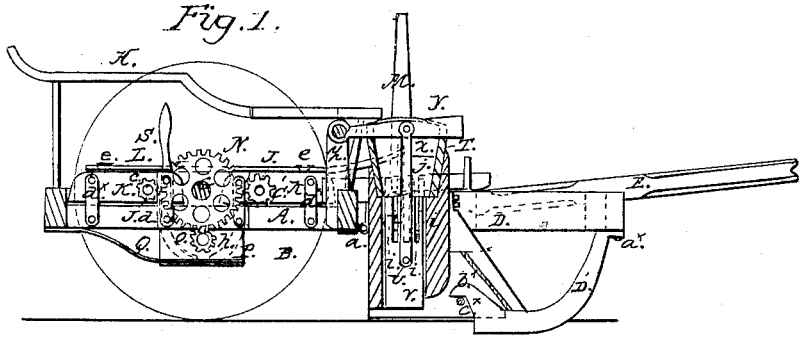
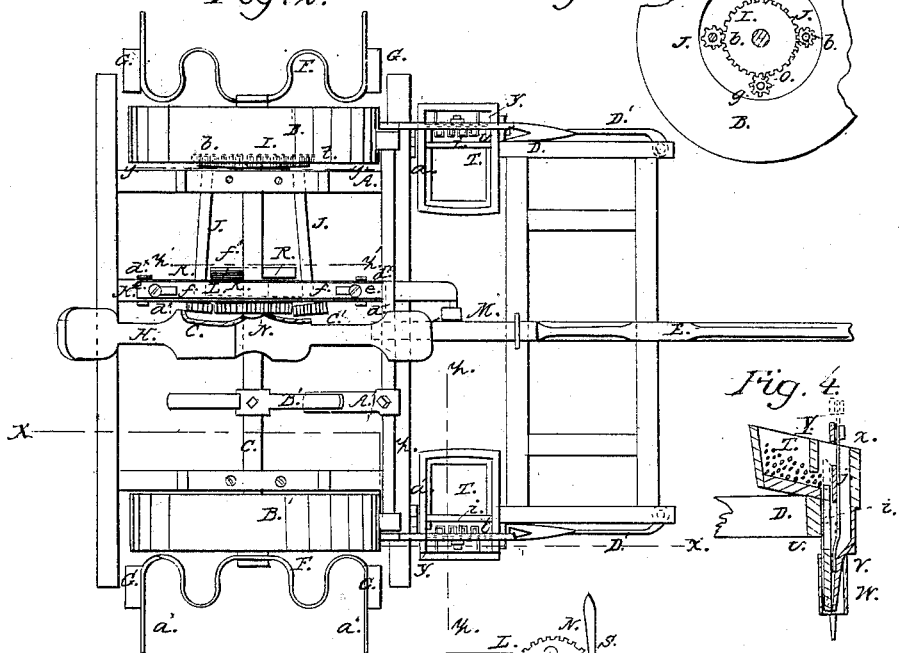
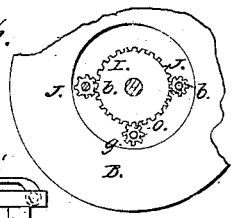
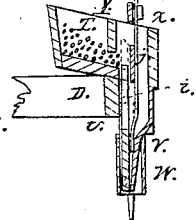
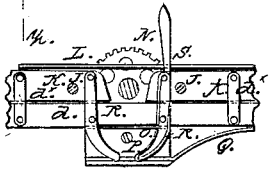
Witnesses:
Inventor:
Joseph Olmsted

UNITED STATES PATENT OFFICE.

JOSEPH OLMSTED, OF KNOXVILLE, ILLINOIS, ASSIGNOR TO HIMSELF AND JOHN H. LEWIS, OF SAME PLACE.

IMPROVEMENT IN CORN-PLANTERS.

Specification forming part of Letters Patent No. 44,920, dated November 1, 1864.

*To all whom it may concern:*

Be it known that I, JOSEPH OLMSTED, of Knoxville, in the county of Knox and State of Illinois, have invented a new and Improved Corn-Planter; and I do hereby declare that the following is a full, clear, and exact description thereof, which will enable those skilled in the art to make and use the same, reference being had to the accompanying drawings, forming part of this specification, in which—

Figure 1 is a side sectional view of my invention, taken in the line $x\ x$, Fig. 2; Fig. 2, a plan or top view of the same; Fig. 3, a longitudinal section of a portion of the same, taken in the line $y\ y$, Fig. 2; Fig. 4, a transverse section of a portion of the same, taken in the line $z\ z$, Fig. 2; Fig. 5, a longitudinal section of a portion of the same, taken in the line $z'\ z'$, Fig. 2.

Similar letters of reference indicate corresponding parts.

This invention relates to a new and improved machine for planting corn in check-rows direct or without any previous furrowing of the ground; and it consists in attaching rotary markers to the axle and arranging the same in connection with gearing and independently of the wheels of the machine in such a manner that the markers may, as the machine is drawn along, be made to gain or lose, as may be required in order to compensate for the inequalities of the surface of the ground and insure the seed being dropped evenly in check-rows.

The invention further relates to a new and useful improvement in the seed-dropping mechanism, and also in an improved manner of attaching the colters to the furrow-openers, as hereinafter set forth, whereby the seed may be dropped with certainty and in an even manner, and the colters very readily detached from the shares when necessary for sharpening, repairs, &c., and also readily placed in working position.

A represents a rectangular frame, which is mounted on two wheels, B B', which are placed loosely on an axle, C.

D is a rectangular frame, which is connected by hinges or joints $a$ to the front end of the frame A, and has the draft-pole E attached to it.

On each end of the axle C there is firmly secured a bar, F. These bars are fitted centrally on the axle, and are bent at their ends at right angles with the main portion, as shown at $a'$, and said parts $a'$ have each a block, G, attached to them, the outer surfaces of which project a trifle beyond the peripheries of the wheels B B', said blocks forming the markers.

H is the driver's seat on the frame A.

I is a toothed wheel, which is attached concentrically to the inner side of the wheel B, and gears into two pinions, $b\ b$, which are on the outer ends of two shafts, J J, the inner ends of the latter having pinions $c\ c'$ on them, one of which, $c$, is smaller than the other one, $c'$, as shown clearly in Fig. 1. The inner ends of the shafts J J are fitted in sliding bearings K K, which are connected by metal straps $d^\times$ to a longitudinal bar, $d$, in the frame A, on which they rest. These bearings K are operated by a slide, L, to the front end of which a lever, M, is attached, the former being actuated through the medium of the latter. This slide L is connected to the bearings K K by means of screws $e$, which pass through oblongs slots $f$ in L into the bearings, and by actuating the slide L either of the pinions $c$ or $c'$ may be shoved in gear with a toothed wheel, N, on the axle C, as may be desired. By this arrangement it will be seen that the axle C may be rotated from the wheel B with a greater or less speed, according to which pinion $c$ or $c'$ is thrown in gear with the wheel N, and consequently the markers G may be rotated with a greater or less speed, corresponding to the revolutions of the axle C.

Underneath the axle C there is a shaft, O, having on its outer end a pinion, $g$, which gears into the toothed wheel I on wheel B, the inner end of said shaft having a pinion, $h$, upon it, which, when required, gears into wheel N, the inner bearing, P, of shaft O having a spring, Q, attached to it, which has a tendency to keep the pinion $h$ in gear with the wheel N.

When the pinion $h$ is in gear with the wheel N the markers G rotate with the same speed as the wheels B B', the relative size of the wheels I N and pinions $g\ h$ being such as to effect that result, and when the pinion $c$ is in gear with wheel N the markers will rotate slower than the wheels B B' and faster than the latter when the pinion $c'$ is in gear with N. When the pinion $c$ is shoved in gear with N the pinion $c'$ will be shoved simultaneously out of gear with it, and $c$ shoved out of gear with N when $c'$ is shoved in gear with it. The pinion $h$ is shoved out of gear with N when either of the pinions $c$ or $c'$ is shoved in gear with it in consequence of levers R, which are attached to the sliding bearings K, acting upon the inner bearing, P, of shaft O. (See more particularly Fig. 5.)

A supplemental lever, S, may be attached to the bar $d$ for the purpose of throwing the pinion $h$ out of gear with the wheel N independently of the movement of the bearings K K. Thus by this arrangement the markers may be made to stand at one given point or turned to the proper place when starting, which has the effect to leave the machine wholly out of gear, so that it may be turned at pleasure or transported from one place to another without any movement of the dropping or planting operators.

T T are two seed-boxes, which are placed on the frame D, one at each side of it, and U is an upright bar, which is fitted in the spout V of each seed-box, said bars being slotted vertically at their upper ends, as shown at $i$, to form seed-receptacles. The upper parts of the bars U U work up into the seed-boxes by the side of partition-plates $j$ therein, and an elastic plate, W, bears against the inner side of each spout V when the bars U are raised or elevated. (See red lines, Fig. 4.) The bars U are connected by rods X with arms Y, attached to a shaft, Z, having an arm, A', fitted on it, which is actuated by a tappet, B', on the axle C. The bars U are raised each time the tappet B' strikes the arm A', and they fall by their own gravity each time the tappet leaves the arm A'. As the bars U rise the slots in their upper ends receive the seed, and as said bars fall the seed passes out from said slots underneath the partitions $j$ and drops into the spouts V, and as the bars are again raised the elastic plates W retain the seed in the lower parts of the spouts until the next descent of the bars U, when it is forced out into the furrows made by shares C', attached to the lower ends of the spouts V.

D' are colters, the front ends of which are attached by screws $a^\times$ to the front end of the frame D. The back ends of these colters are provided with a hook or lip, $b'$, which fit over pins $c^\times$ in the shares C', as shown clearly in Fig. 1. By this arrangement it will be seen that the colters may be readily detached at any time for sharpening by unscrewing the screws $a^\times$, and also readily replaced.

I claim as new and desire to secure by Letters Patent—

1. The arrangement of the gearing I N $b$ $b$ $c$ $c'$ $g$ $h$ and shafts J J O and axle C, substantially as shown and described, for the purpose of varying the speed of the rotary markers G relatively with the wheels B B', substantially as and for the purpose specified.

2. The bars U, slotted at their upper ends and fitted within the spouts V and seed-boxes T, as shown, in combination with the elastic plates W, all arranged to operate in the manner substantially as and for the purpose set forth.

3. The attaching the rear ends of the colters D' to the shares C' by means of the lips $b^\times$ and pins $c^\times$, substantially as and for the purpose described.

4. The levers R, with the bearings K K, attached to slotted slide L, operated by means of lever M, substantially as and for the purpose described.

5. Lever S, attached to bar $d$, in combination with the spring Q and bearing P, substantially as and for the purposes described.

JOSEPH OLMSTED.

Witnesses:
GEO. L. EDICK,
SAM L. CHARLES.